F. F. ELLIS.
ANIMAL TRAP.
APPLICATION FILED DEC. 27, 1910.
1,058,355.
Patented Apr. 8, 1913.
2 SHEETS—SHEET 1.
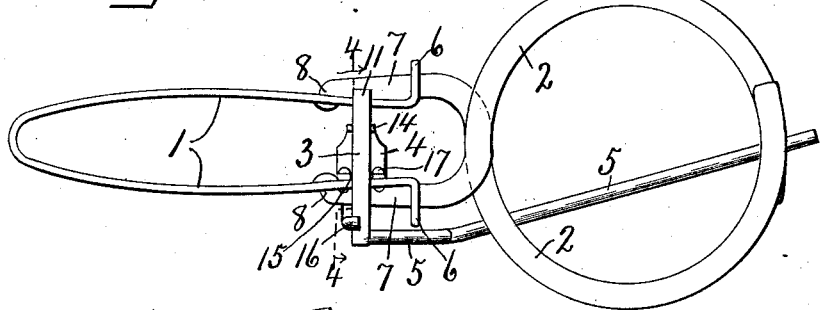
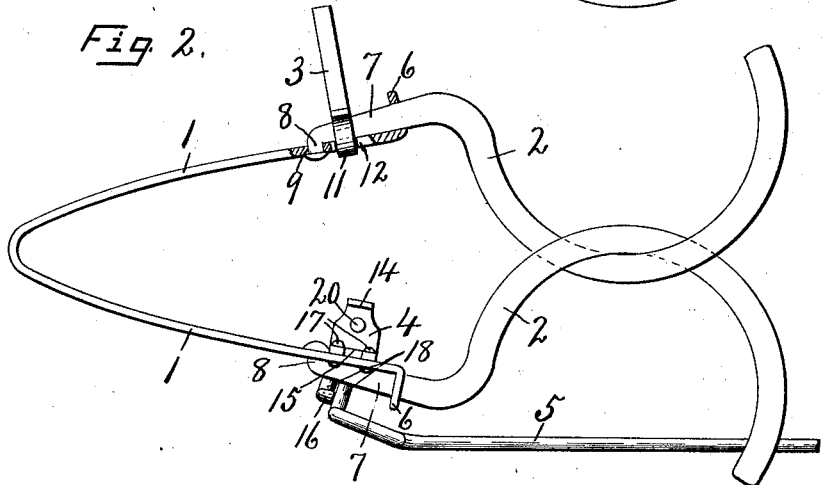
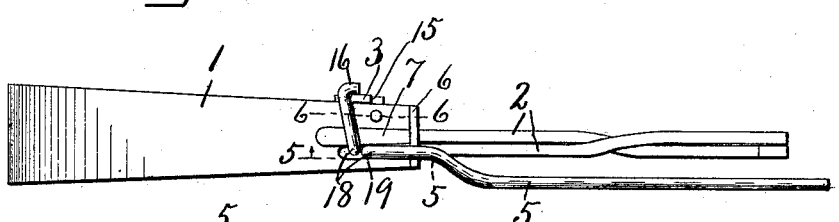
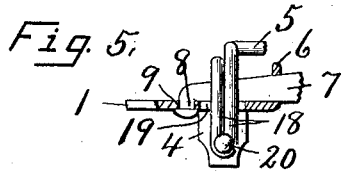
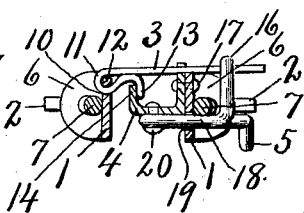
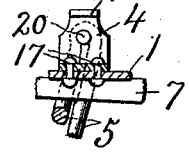
Witnesses:
R.W. Bailey
H.E. Chase
Inventor:
F. F. Ellis
By
Howard P. Denison
Attorney.

F. F. ELLIS.
ANIMAL TRAP.
APPLICATION FILED DEC. 27, 1910.
1,058,355.
Patented Apr. 8, 1913.
2 SHEETS—SHEET 2.
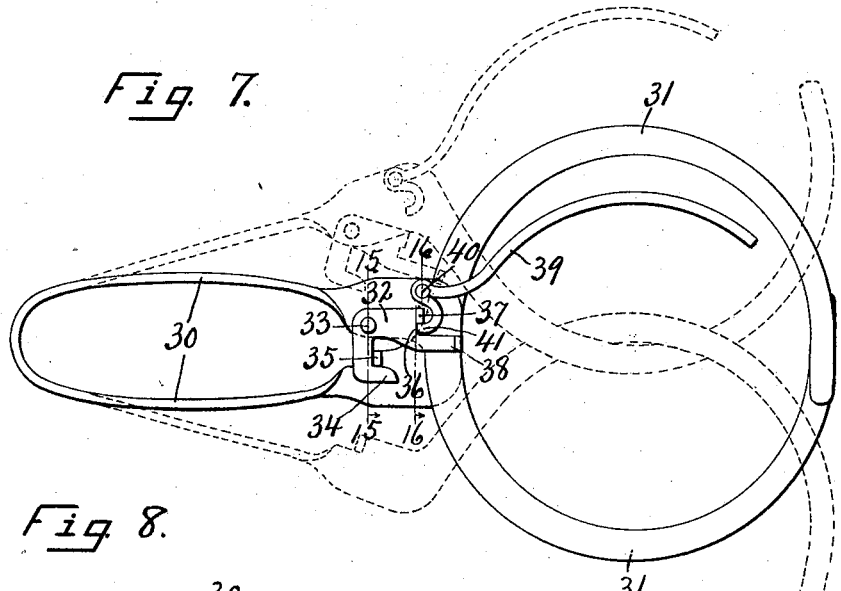
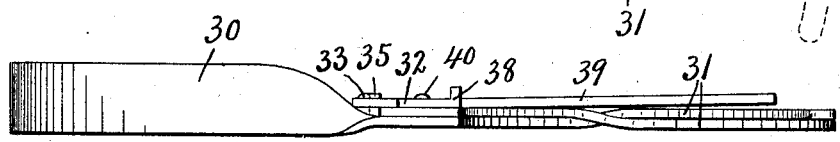
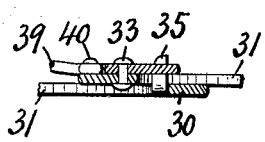
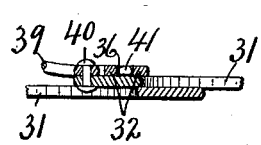
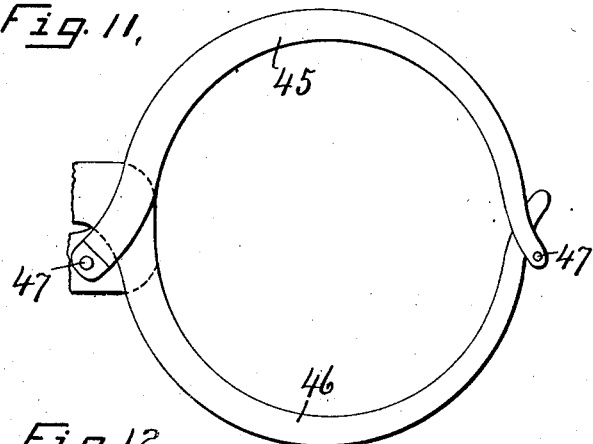
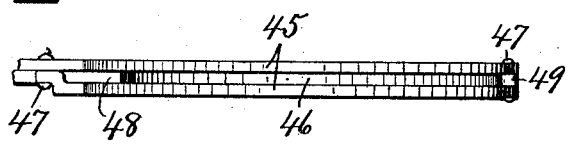
Witnesses:
R.W. Bailey.
H. E. Chase
Inventor:
F. F. Ellis
By Howard P. Denison
Attorney.
COLUMBIA PLANOGRAPH CO., WASHINGTON, D. C.

UNITED STATES PATENT OFFICE.

FERRAND F. ELLIS, OF ONEIDA, NEW YORK, ASSIGNOR TO ONEIDA COMMUNITY, LIMITED, OF ONEIDA, NEW YORK.

ANIMAL-TRAP.

1,058,355.  Specification of Letters Patent.  Patented Apr. 8, 1913.

Application filed December 27, 1910. Serial No. 599,238.

*To all whom it may concern:*

Be it known that I, FERRAND F. ELLIS, of Oneida, in the county of Madison, in the State of New York, have invented new and useful Improvements in Animal-Traps, of which the following, taken in connection with the accompanying drawings, is a full, clear, and exact description.

This invention relates to certain improvements in animal traps of the spring jaw type involving the use of spring arms united at one end and having their free ends spring tensioned to spread apart and provided with crossed jaws curved in opposite directions and adapted to be held in their open position by suitable means at their junctions with the spring arms, said holding means being adapted to be tripped by a suitable trigger extending at least partially across the opening between the jaws when the trap is set.

The main object is to enable a trap of this character to be made of a minimum number of parts without excessive waste of stock and at the same time to assemble such parts in such manner as to assure the necessary strength and freedom of action and to avoid any possibility of the jaws being sprung apart when closed upon an animal. In other words, I have sought to produce a trap of this character which is light, strong and durable and capable of being manufactured at a comparatively small cost.

Another object is to locate the means for holding the trap in its open position near the junction of the jaws with the spring arms so as not to interfere with the free action of the spring or free access of the animal between the jaws and at the same time to arrange the tripping trigger so that it will project at least partially across the opening between said jaws when the trap is set.

Other objects and uses relating to specific parts of the trap will be brought out in the following description:

In the drawings: Figures 1 and 2 are top plans of one form of my improved trap in its sprung and set positions respectively. Fig. 3 is a side elevation of the same trap. Fig. 4 is a transverse sectional view of the trap at the junction of the jaws with the spring arms taken on lines 4—4 Fig. 1 showing particularly the detent and tripping trigger therefor. Fig. 5 is a lengthwise sectional view of a portion of the same trap taken on line 5—5, Fig. 3 as viewed from the under side showing particularly the connections between the jaws and spring arms and also the pivotal end of the tripping trigger. Fig. 6 is also a lengthwise sectional view taken on line 6—6, Fig. 3 showing the catch for interlocking with the detent. Fig. 7 is a plan view of a trap similar to that shown in Fig. 1 except that the jaws are shown integral with the spring arms and the holding and releasing mechanism is somewhat modified. Fig. 8 is a side elevation of the trap shown in Fig. 7. Figs. 9 and 10 are transverse sectional views taken respectively on lines 15—15 and 16—16 Fig. 7. Figs. 11 and 12 are respectively a top plan and side elevation of a portion of a trap showing a modified form of jaws in which one of the jaws is provided with a lengthwise slot through which the other jaw plays.

The trap shown in Figs. 1 to 6 inclusive comprises a pair of spring arms —1— preferably united integrally at one end and having their opposite ends spring tensioned to spread apart and provided with crossed jaws —2— which, in this instance, are made separately from but are rigidly secured to the adjacent ends of the spring arms —1— in a manner hereinafter described. The jaws are locked in their open position against the action of the spring —1— by suitable holding means located in proximity to the junction of said jaws with the spring and, in this instance, consisting of a detent —3— movable into and out of interlocking engagement with a catch plate —4— and normally held in its locking position by a trigger —5—. The ends of the spring arms —1— adjacent the jaws are provided with laterally and outwardly projecting offsets —6— having apertures for receiving the shanks as —7— of the jaws, the ends of said shanks being extended some distance through and beyond the opening in the offsets —6— against the outer faces of the spring arms and terminate in inwardly projecting studs —8— which are passed through apertures —9— in the springs arms —1—, and their inner ends upset or riveted against the adjacent faces of the springs to rigidly lock the jaws thereto as best seen in Fig. —5—.

The gripping portions of the jaws are substantially semi-circular and curved in opposite directions and are disposed in intersecting planes with their bases and ends overlapping and in sliding contact. That is, the bases of the jaws are deflected toward and preferably across each other with their adjacent faces in sliding contact, while the opposite faces of the outer ends are in sliding contact so that when the jaws close upon the animal, they interlock or cross each other as shown in Fig. 2, thereby preventing any possibility of the jaws being sprung apart laterally.

One end of the detent —3— is passed through a suitable opening —10— in one of the spring arms —1— between the offset —6— and end of the shank —7— and is preferably bent in the form of an eye —11— engaged with a pintle —12—, said end terminating in a hook —13— for interlocking engagement with a shoulder —14— on the catch plate —4—. The opposite end of the detent is extended laterally across the adjacent edges of the spring arms —1— and when in its holding position is seated in a recess —15— in one end of the catch plate to hold it against lateral shifting movement.

When the trap is set, the detent extends some distance beyond the spring arm —1— opposite that to which it is pivoted and is engaged by a hook-shaped portion —16— of the trigger arm —5— which serves to hold the detent in its locking position.

The catch plate —4— is secured by suitable fastening means as rivets —17— to the spring arm —1— opposite that to which the detent —3— is pivoted and projects inwardly therefrom so that when it is engaged by the hook-shaped portion —13— of the detent and the latter is held in its locking position by the trigger —5—, the jaws —2— will be held in their set position against action of the spring arms —1—. This trigger is preferably made of comparatively stiff wire and is provided with a laterally projecting loop —18— extending through an aperture —19— in the spring —1— to which the catch plate —4— is secured and is pivoted to said catch plate by a pivotal bolt or rivet —20— as best seen in Figs. 4 and 5. The trigger is therefore pivoted to swing horizontally about a vertical axis which is, in this instance, located between the spring arms —1— while the hook —16— is located some distance to the outside of the same arm to which the catch plate is secured and it is therefore adapted to be moved horizontally into and out of engagement with the detent —3— as the trigger is rocked. The opposite end of the trigger is extended in the direction of the jaws and preferably to the outer ends thereof and when the trap is adjusted for use, this trigger extends across the opening between said jaws so that the slightest lateral pressure on the trigger by any portion of an animal which may enter between the jaws will disengage the hook —16— from the detent, thereby releasing the detent from its holding position and allowing the jaws to instantly close upon the animal.

In Figs. 7 to 12 inclusive I have shown a pair of spring arms —30— integrally united at one end and having their opposite ends provided with integral jaws —31— disposed in intersecting planes in substantially the same manner as shown in Fig. 1, the only substantial difference being that the jaws are integral with their spring arms rather than being made of separate pieces. In this construction the number of parts are still further reduced and may be preferable to the structure shown in the previous figures. In like manner the means for holding and releasing the jaws is somewhat simplified and consists, in this instance, of a detent —32— pivoted at —33— to one of the spring arms near its junction with its corresponding jaw to swing in a horizontal position or parallel with the plane of the jaws and is preferably made in the form of a bell-crank lever having one arm provided with a hook —34— movable into and out of engagement with a shoulder —35— on the opposite spring arm. The other arm of the detent is provided with a recess —36— and shoulders —37— and —38— at opposite sides of the recess for a purpose presently described. A trigger arm —39— is pivoted at —40— to the same spring arm to which the detent —32— is pivoted and is also adapted to swing horizontally, said trigger arm being provided with a comparatively short hook-shaped extremity —41— movable into and out of the recess —36— or into and out of engagement with the shoulder —37— for locking and releasing the detent, the opposite end of the trigger being extended across the open side of one of the jaws as best seen in Fig. 7 where it is adapted to be engaged by an animal in entering between the jaws and thereby rocked sufficiently to release the detent and allow the jaws to close upon the animal under the tension of the springs —30—, the shoulder —38— serving as a thumb-piece by means of which the detent is readily operated.

In Figs. 11 and 12 I have shown a pair of jaws 45 and 46 similar to the jaws —31— except that one of the jaws as —45— is made in two curved sections having their bases and points secured together by suitable fastening means as rivets —47—, the intervening portions being spaced apart to form a lengthwise slot —48— of sufficient depth to permit the free action of the jaw —46— therethrough, the outer ends of the jaws being held apart by a spacing sleeve —49— which also serves as a limiting stop coacting with the outer end of the other jaw to limit the opening movement of said jaws. Otherwise the trap is the same as shown in Fig. 7.

What I claim is:

1. An animal trap comprising spring arms united at one end and having their opposite ends tensioned to spring apart, a pair of curved interlocking jaws attached to the respective ends of said springs, an angular plate mounted upon one of said springs, a detent pivoted upon the other and adapted to engage the angular plate, and a trip in engagement with the detent.

2. An animal trap having spring operated crossed jaws curved in opposite directions, a catch plate provided with a projecting shoulder mounted on one of said jaws, a detent having diverging arms mounted on the other, one of said arms adapted to engage the shoulder on the catch plate, and a trip operably engaged with the other arm for holding and releasing the engagement of the detent with the catch plate.

3. An animal trap comprising spring arms terminating in jaws which are curved in opposite directions, a catch plate mounted upon one of said arms, a trip mounted upon the catch plate, a detent mounted on the other arm and having its ends extending at an angle to each other, one of said ends adapted to engage the catch plate and the other end engaging the trip.

4. An animal trap comprising spring arms terminating at one end in crossed jaws, a catch plate mounted upon one of said arms, a trip pivotally mounted upon the catch plate, a detent adapted to engage the catch plate for holding the trap in set position, said trip adapted to engage the detent for holding and releasing the engagement of the detent with the catch plate.

In witness whereof I have hereunto set my hand on this 23 day of December 1910.

FERRAND F. ELLIS.

Witnesses:
ORRIN D. WRIGHT,
ELIZABETH C. SNOW.

Copies of this patent may be obtained for five cents each, by addressing the "Commissioner of Patents, Washington, D. C."